United States Patent
Okazaki et al.

(10) Patent No.: US 10,381,922 B2
(45) Date of Patent: Aug. 13, 2019

(54) POWER CONVERTER

(71) Applicant: CALSONIC KANSEI CORPORATION, Saitama-shi, Saitama (JP)

(72) Inventors: Fumihiro Okazaki, Saitama (JP); Gen Okuzuka, Saitama (JP); Yuuichirou Nomura, Saitama (JP); Masaharu Nagano, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 0 days.

(21) Appl. No.: 15/574,038

(22) PCT Filed: May 17, 2016

(86) PCT No.: PCT/JP2016/064541
§ 371 (c)(1),
(2) Date: Nov. 14, 2017

(87) PCT Pub. No.: WO2016/186089
PCT Pub. Date: Nov. 24, 2016

(65) Prior Publication Data
US 2018/0301983 A1    Oct. 18, 2018

(30) Foreign Application Priority Data

May 18, 2015  (JP) .................. 2015-101113
May 18, 2015  (JP) .................. 2015-101134
Apr. 27, 2016  (JP) .................. 2016-089221

(51) Int. Cl.
B60L 11/18    (2006.01)
H02M 1/44    (2007.01)
(Continued)

(52) U.S. Cl.
CPC .............. *H02M 1/44* (2013.01); *B60L 53/11* (2019.02); *B60L 53/20* (2019.02); *B60L 53/22* (2019.02);
(Continued)

(58) Field of Classification Search
CPC .. B60L 11/18; B60L 11/1801; B60L 11/1803; B60L 11/1809; B60L 11/1811;
(Continued)

(56) References Cited

U.S. PATENT DOCUMENTS 5,994,789 A * 11/1999 Ochiai ................ B60L 11/1803
                                                180/65.1
2003/0029654 A1 * 2/2003 Shimane .................. B60K 6/28
                                                180/65.29
(Continued)

FOREIGN PATENT DOCUMENTS

EP    2 816 717 A2    12/2014
JP    H09-126617 A    5/1997
(Continued)

*Primary Examiner* — William Hernandez
(74) *Attorney, Agent, or Firm* — Foley & Lardner LLP

(57) ABSTRACT

Provided is a power converter including: a power module that converts direct-current electric power from a power storage apparatus and alternating-current electric power to be supplied to a load; a DC/DC converter that converts direct-current voltage from the power storage apparatus; a charger that controls charging of power storage apparatus with electrical power supplied via an external connector; a capacitor module that has a capacitor for smoothing voltage; and a case that accommodates the power module, the DC/DC converter, the charger, and the capacitor module. In the case, the power module, the charger, and the DC/DC converter are arranged around the capacitor module.

12 Claims, 11 Drawing Sheets

(51) Int. Cl.
*H02P 27/06* (2006.01)
*H02J 7/00* (2006.01)
*H02J 7/02* (2016.01)
*H02M 7/00* (2006.01)
*B60L 53/22* (2019.01)
*B60L 53/20* (2019.01)
*B60L 53/10* (2019.01)
*H02M 1/00* (2006.01)

(52) U.S. Cl.
CPC ............ *H02J 7/0042* (2013.01); *H02J 7/022* (2013.01); *H02M 7/003* (2013.01); *H02P 27/06* (2013.01); *B60L 2210/10* (2013.01); *B60L 2210/40* (2013.01); *H02M 2001/0048* (2013.01)

(58) Field of Classification Search
CPC ... B60L 11/1812; B60L 2210/40; H02M 1/44; H02M 2001/0048; H02M 7/003; H02P 27/06; Y02T 10/7005; Y02T 10/92; Y02T 90/127

USPC ......... 307/9.1, 10.1, 19, 20, 43, 71, 82, 151; 363/146

See application file for complete search history.

(56) References Cited

U.S. PATENT DOCUMENTS

| | | | | |
|---|---|---|---|---|
| 2012/0299377 | A1* | 11/2012 | Masuda | B60L 11/005 307/10.1 |
| 2014/0028256 | A1* | 1/2014 | Sugiyama | B60L 1/006 320/109 |
| 2015/0043132 | A1 | 2/2015 | Miyashita et al. | |
| 2017/0027537 | A1* | 2/2017 | Zhang | H05G 1/12 |
| 2018/0334043 | A1* | 11/2018 | Zou | B60L 11/1811 |

FOREIGN PATENT DOCUMENTS

| | | |
|---|---|---|
| JP | 2013-209078 A | 10/2013 |
| JP | 2015-006077 A | 1/2015 |
| WO | WO-2013/080665 A1 | 6/2013 |
| WO | WO-2013/081097 A1 | 6/2013 |

* cited by examiner

POWER CONVERTER

TECHNICAL FIELD

The present invention relates to a power converter mounted on electric automobiles, hybrid automobiles, and so forth.

BACKGROUND ART

A power converter mounted on the electric automobiles, hybrid automobiles, and so forth includes a power module and various electronic devices, and there has been a problem in that the size of a housing is increased due to arrangement of respective components.

In order to solve such a problem, JP2013-209078A discloses an electrical unit in which, within an accommodating case, high-voltage components are arranged towards the forward direction of a vehicle and low-voltage components are arranged towards the rearward direction of the vehicle.

SUMMARY OF INVENTION

With the conventional technique described in JP2013-209078A, even when an impact input is applied, the low-voltage components function as cushioning materials for the high-voltage components, and so, it is possible to prevent, even when an impact input is applied, the high-voltage components from being exposed without making the size of the unit larger.

On the other hand, in the conventional technique described in JP2013-209078A, there is no consideration of a loss of electrical power in wirings. Especially, there is a problem in that the longer the path of the wirings for connecting a power device, a capacitor, and so forth is, the larger the resistance value and inductance in the path become, and the larger the electrical power loss and electric noise become.

The present invention has been conceived in light of the above-described problem, and an object thereof is to provide a power converter that is capable of reducing electrical power loss and electric noise and reducing the size of the converter.

According to one aspect of the present invention, a power converter including: a power module that converts direct-current electric power from a power storage apparatus and alternating-current electric power to be supplied to a load; a DC/DC converter that converts direct-current voltage from the power storage apparatus; a charger that controls charging of power storage apparatus with electrical power supplied via an external connector; a capacitor module that has a capacitor for smoothing voltage; and a case that accommodates the power module, the DC/DC converter, the charger, and the capacitor module. In the case, the power module, the charger, and the DC/DC converter are arranged around the capacitor module.

According to the above-mentioned aspect of the present invention, because the power module, the charger, and the DC/DC converter are arranged around the capacitor module in the case, it is possible to minimize distances of electrical power wires between the capacitor module and each of the power module, the charger, and DC/DC converter. With such a configuration, because resistance and inductance in the path of direct-current electric power can be made small, it is possible to reduce electrical power loss and electric noise.

DESCRIPTION OF EMBODIMENTS

An embodiment of the present invention will be described below with reference to the drawings.

First Embodiment

Figure 1:
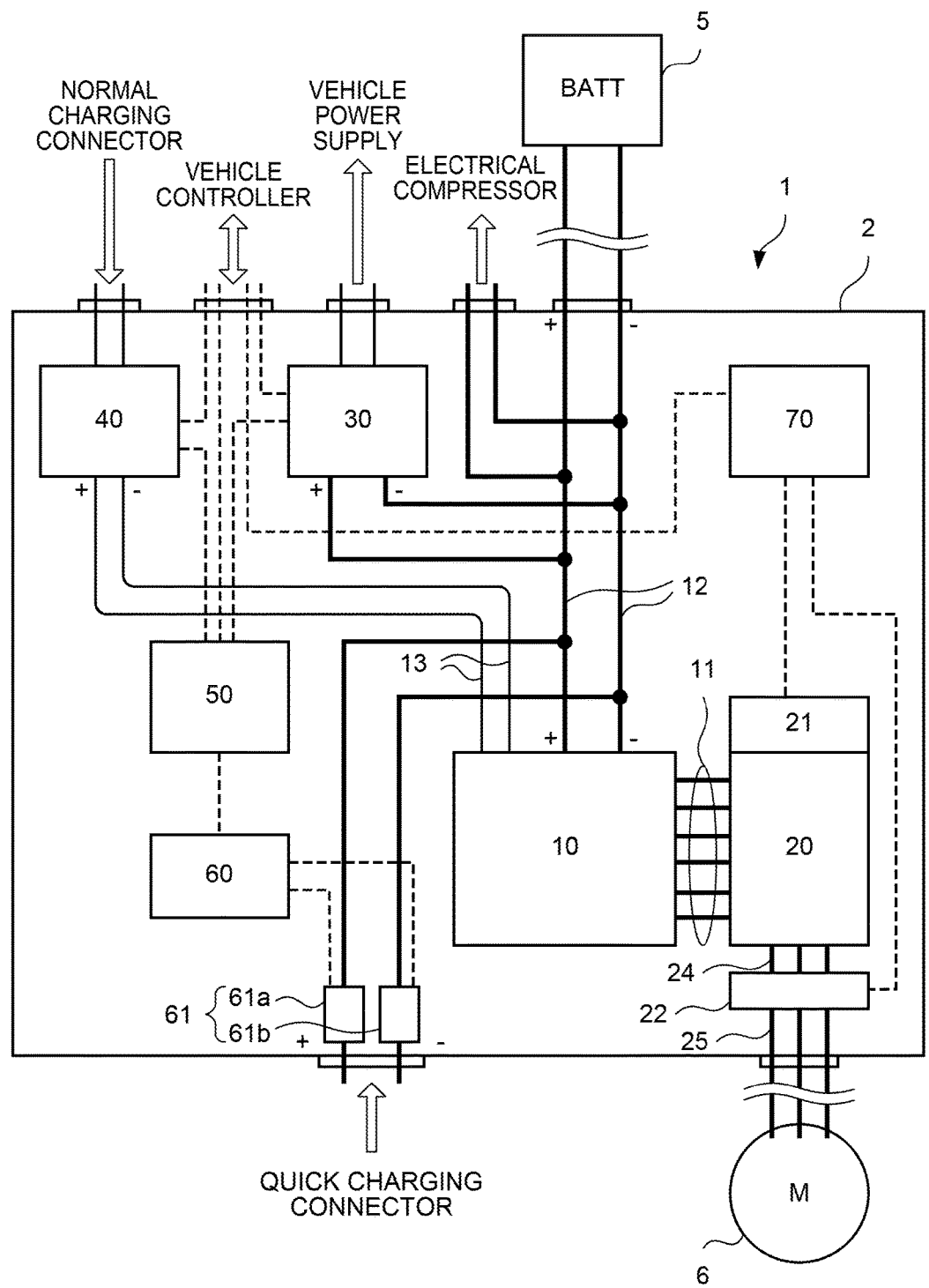
FIG. 1 is a functional block diagram of a power converter of a first embodiment of the present invention.

FIG. 1 is a functional block diagram of a power converter 1 of the embodiment of the present invention.

The power converter 1 (vehicle power converter) is provided in an electric vehicle or a plug-in hybrid vehicle, and converts electrical power from a power storage apparatus (battery) 5 to electrical power suitable for driving a dynamo-electric machine (motor generator) 6. The motor generator 6 serving as a load is driven by the electrical power supplied from the power converter 1, and thereby, the vehicle is driven.

The power converter 1 converts regenerative electrical power from the motor generator 6 to direct-current electric power and charges the battery 5 therewith. In addition, the battery 5 is charged by the power converter 1 by supplying electrical power through a quick charging connector or a normal charging connector provided on the vehicle.

The battery 5 is formed of, for example, a lithium ion secondary battery. The battery 5 supplies direct-current electric power to the power converter 1, and battery 5 is charged by direct-current electric power supplied by the power converter 1. The voltage of the battery 5 varies over a range of, for example, from 240 to 400 V, and the battery 5 is charged by inputting higher voltage than this voltage.

The motor generator 6 is configured as, for example, a permanent magnet synchronous motor. The motor generator 6 is driven by alternating-current electric power supplied by the power converter 1, and thereby, the vehicle is driven. When the vehicle slows down, the motor generator 6 generates regenerative electrical power.

The power converter 1 includes, in a case 2, a capacitor module 10, a power module 20, a DC/DC converter 30, a charger 40, a DC/DC charge controller 50, and an inverter controller 70. Each of these components are connected electrically by bus bars or wires.

The capacitor module 10 is formed of a plurality of capacitor elements. The capacitor module 10 performs removal of noise and suppression of voltage fluctuation by smoothing the voltage. The capacitor module 10 includes first bus bars 11, second bus bars 12, and electrical power wires 13.

The first bus bars 11 are connected to the power module 20. The second bus bars 12 are connected to the DC/DC converter 30, relays 61, the battery 5, and an electric compressor (not shown). The electrical power wires 13 are formed of flexible cables (for example, litz wires) and are connected to the charger 40. The first bus bars 11, the second bus bars 12, and the electrical power wires 13 share the positive electrode and the negative electrode in the capacitor module 10.

The power module 20 mutually converts direct-current electric power and alternating-current electric power by turning ON/OFF a plurality of power elements (not shown). ON/OFF control of the plurality of power elements is performed by a drive substrate 21 provided in the power module 20.

The power module 20 is connected to the first bus bars 11 of the capacitor module 10. The first bus bars 11 are formed of three pairs of bus bars composed of the positive electrodes and the negative electrodes. The power module 20 is provided with three-phase output bus bars 24 formed of U-phase, V-phase, and W-phase. The output bus bars 24 are connected to a current sensor 22. The current sensor 22 includes motor-side bus bars 25 that output three-phase alternating-current electric power to the motor generator 6 side.

The inverter controller 70 outputs to the drive substrate 21 a signal for operating the power module 20 on the basis of an instruction from a controller (not shown) of the vehicle and detection result of the electric current of the U-phase, the V-phase, and the W-phase from the current sensor 22. The drive substrate 21 controls the power module 20 on the basis of the signal from the inverter controller 70. An inverter module that mutually converts direct-current electric power and alternating-current electric power is formed of the inverter controller 70, the drive substrate 21, the power module 20, and the capacitor module 10.

The DC/DC converter 30 converts voltage of direct-current electric power supplied from the battery 5 and supplies it to other devices. The DC/DC converter 30 decreases voltage of direct-current electric power from the battery 5 (for example, 400 V) to 12 V direct-current electric power. Direct-current electric power voltage of which has been decreased is supplied as a power supply to a controller, lighting, fan, and so forth mounted on the vehicle. The DC/DC converter 30 is connected to the capacitor module 10 and the battery 5 via the second bus bars 12.

The charger 40 converts commercial power supply (for example, AC 200 V) that is supplied from an external charging connector provided in the vehicle via a normal charging connector 81 to direct-current electric power (for example, 500 V). Direct-current electric power converted by the charger 40 is supplied from the electrical power wires 13 to the battery 5 via the capacitor module 10. With such a configuration, the battery 5 is charged.

The DC/DC charge controller 50 controls driving of the motor generator 6 and charging of the battery 5 by the power converter 1. Specifically, on the basis of the instruction from the controller of the vehicle, the DC/DC charge controller 50 controls the charging of the battery 5 by the charger 40 via the normal charging connector 81, charging of the battery 5 via a quick charging connector 63, the driving of the motor generator 6, and the lowering of voltage by the DC/DC converter 30.

A relay controller 60 controls on/off of the relays 61 by the control performed by the DC/DC charge controller 50. The relays 61 are formed of a positive-side relay 61a and a negative-side relay 61b. The relays 61 allows conduction of electricity when connection at the external charging connector is established via the quick charging connector 63 and supplies direct-current electric power (for example 500 V) supplied from the quick charging connector to the second bus bars 12. The battery 5 is charged by direct-current electric power thus supplied.

Figure 2:
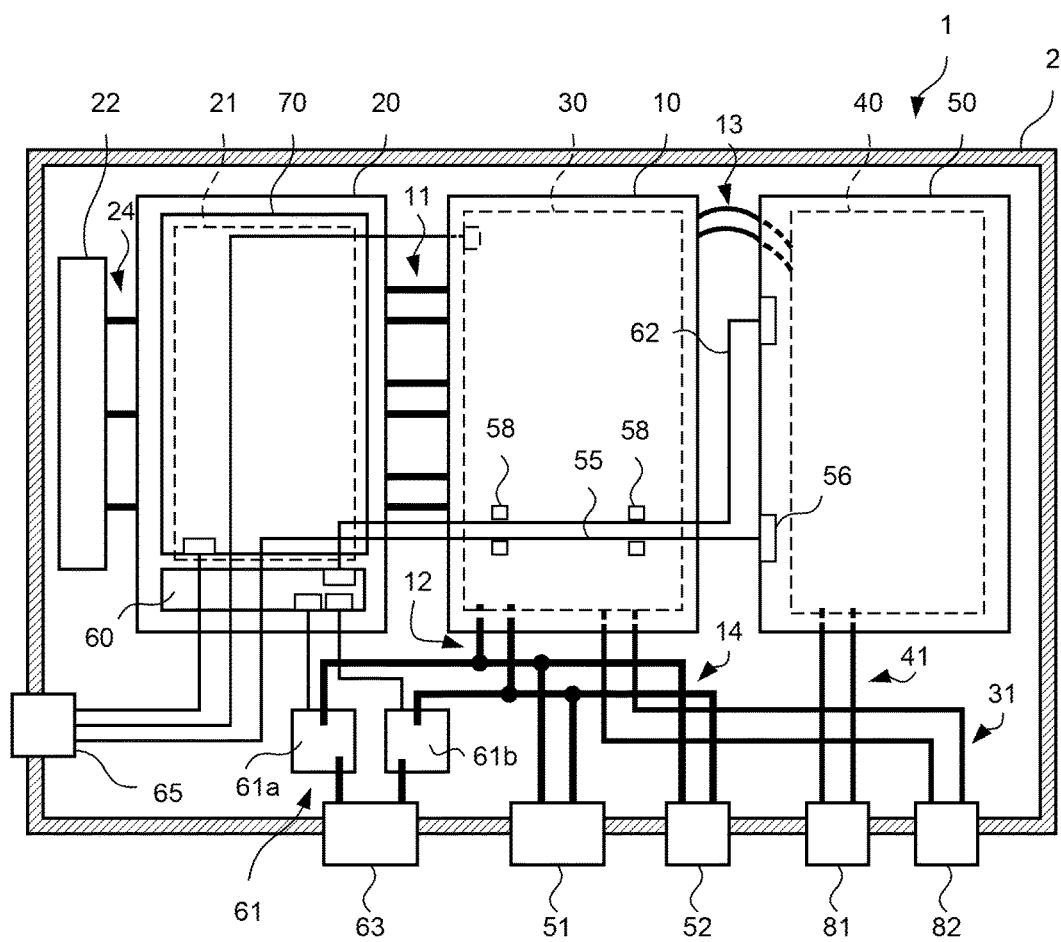
FIG. 2 is a structural block diagram of the power converter of the first embodiment of the present invention.
Figure 3:
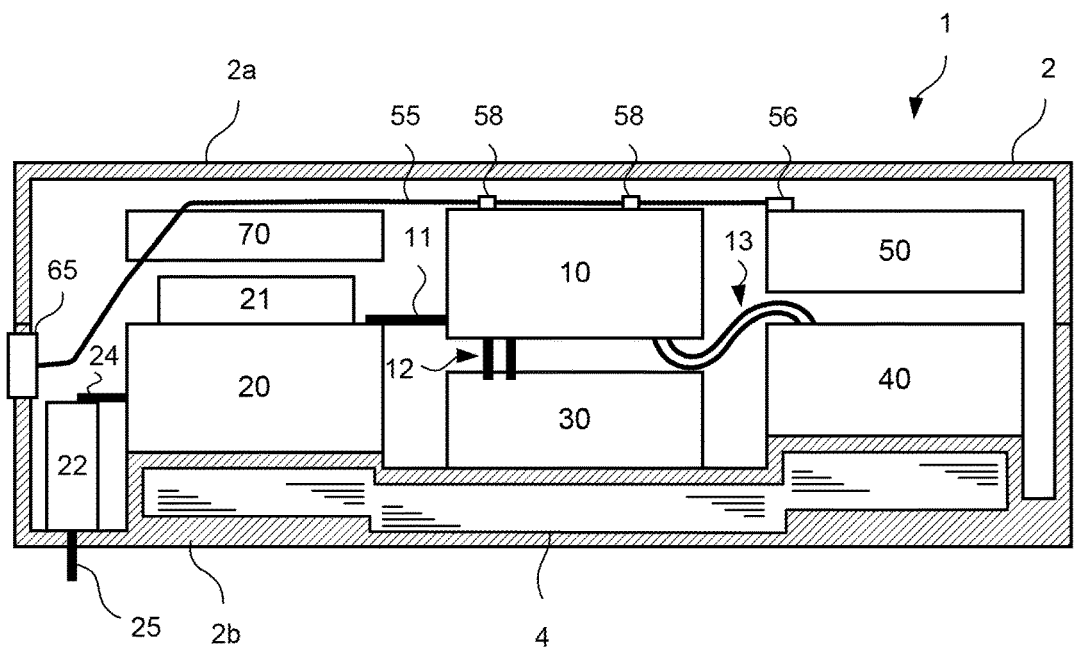
FIG. 3 is a structural block diagram of the power converter of the first embodiment of the present invention.

FIGS. 2 and 3 are structural block diagrams of the power converter 1 of this embodiment. FIG. 2 is a top view of the power converter 1, and FIG. 3 is a side view of the power converter 1.

In the case 2, the power module 20, the DC/DC converter 30, and the charger 40 are arranged around the capacitor module 10.

More specifically, in the case 2, the capacitor module 10 is arranged between the power module 20 and the charger 40. The capacitor module 10 is layered over the DC/DC converter 30, and the DC/DC converter 30 is arranged below the capacitor module 10. The charger 40 is layered over the DC/DC charge controller 50, and the charger 40 is arranged below the DC/DC charge controller 50.

The first bus bars 11 project out from one side surface of the capacitor module 10. The first bus bars 11 are directly connected to the power module 20 by using screws, etc. From the power module 20, three-phase output bus bars 24 that consist of the U-phase, the V-phase, and the W-phase project out at the opposite side from the first bus bars 11.

The output bus bars 24 are directly connected to the current sensor 22 by using screws, etc. The motor-side bus bars 25 project out from the bottom side of the current sensor 22 (see FIG. 3). The motor-side bus bars 25 are respectively connected to the U-phase, the V-phase, and the W-phase of the output bus bars 24 of the power module 20 directly, and output three-phase alternating-current electric power. The motor-side bus bars 25 are formed so as to be exposed from the case 2 and are connected to the motor generator 6 by a harness, etc.

The drive substrate 21 is layered on a top surface of the power module 20. The inverter controller 70 and the relay controller 60 are arranged so as to be layered above the drive substrate 21.

The second bus bars 12 project out from the bottom surface side of the capacitor module 10. The second bus bars 12 are connected, by using screws, directly to the DC/DC converter 30 that is arranged so as to be layered below the capacitor module 10. The second bus bars 12 are connected to the positive-side relay 61a and the negative-side relay 61b (see FIG. 1).

The second bus bars 12 are respectively connected via bus bars 14 to a battery-side connector 51 to which the battery 5 is connected and a compressor-side connector 52 to which an electric compressor is connected.

The DC/DC converter 30 is connected to a vehicle-side connector 82 via bus bars 31. The vehicle-side connector 82 is connected to harnesses, etc. for supplying direct-current power supply output from the DC/DC converter 30 to respective parts of the vehicle.

The electrical power wires 13 project out from the side of the capacitor module 10 opposite from the first bus bars 11. The electrical power wires 13 are flexible cables having bendability and are connected to the charger 40. The charger 40 is connected to the normal charging connector 81 via bus bars 41.

A signal line connector 65 allows connection between the outside of the case 2 and signal lines connected to the DC/DC converter 30, the charger 40, the DC/DC charge controller 50, and the inverter controller 70 of the power converter 1.

A signal line 55 is connected between the signal line connector 65 and the DC/DC charge controller 50. The signal line 55 is connected to a connector 56 of the DC/DC charge controller 50 by extending through a top surface of the capacitor module 10 together with a signal line 62 provided from the DC/DC charge controller 50 to the relay controller 60. Guide parts 58 for supporting the signal line 55 and the signal line 62 are formed on the top surface of the capacitor module 10.

The case 2 is formed of an upper case 2a and a bottom case 2b. A coolant-water channel 4 is formed in the bottom case 2b. The coolant-water channel 4 is formed such that coolant water flows therethrough and cools the power module 20, the DC/DC converter 30, and the charger 40 mounted directly above the coolant-water channel 4.

As described above, in the embodiment of the present invention, the power converter 1 converts and supplies electrical power between the power storage apparatus (the battery 5) and the load (the motor generator 6) and includes: the power module 20 that converts direct-current electric power from the battery 5 and alternating-current electric power to be supplied to the motor generator 6; the DC/DC converter 30 that converts direct-current voltage from the battery 5; the charger 40 that charges the battery 5 with electrical power supplied via the external connector (the normal charging connector 81); the capacitor module 10 that has capacitors for smoothing voltage; and the case 2 that accommodates the power module 20, the DC/DC converter 30, the charger 40, and the capacitor module 10. In the power converter 1, the power module 20, the DC/DC converter 30, and the charger 40 are arranged around the capacitor module 10 in the case 2.

With the above-mentioned configuration, because distances between the capacitor module 10 and each of the power module 20, the DC/DC converter 30, and the charger 40 can be made shorter in the case 2, it is possible to reduce resistance (R) and inductance (L) on the paths of direct-current electric power and to reduce electrical power loss and electric noise. Furthermore, because the distances between the capacitor module 10 and each of the power module 20, the DC/DC converter 30, and the charger 40 in the case 2 can be made shorter, it is possible to reduce the size of the power converter 1.

In addition, in the power converter 1 of the embodiment of the present invention, the capacitor module 10 is arranged between the power module 20 and the charger 40. In other words, because the capacitor module 10 is arranged between the power module 20 and the charger 40 that generate large amount of heat, it is possible to suppress mutual influence by the heat between the power module 20 and the charger 40. Especially, because operation of the power module 20 (power running and regeneration of the motor generator 6) and operation of the charger 40 (charging of the battery 5 by electrical power from the normal charging connector 81) are not performed at the same time, it is possible to eliminate influence by the heat between the operations.

In addition, in the embodiment of the present invention, because the DC/DC converter 30 is arranged so as to be layered with the capacitor module 10, the capacitor module 10 and the DC/DC converter 30 are arranged so as to be adjacent in the layered direction in the case 2, and it is possible to reduce the size of the power converter 1.

In addition, in the power converter 1 of the embodiment of the present invention, the capacitor module 10 includes first terminals (the first bus bars 11), second terminals (the second bus bars 12), and third terminals (the electrical power wires 13), and the first terminals are connected to the power module 20, the second terminals are connected to the DC/DC converter 30, and the third terminals are connected to the charger 40. With such a configuration, because electrical power paths between the capacitor module 10 and each of the power module 20, the DC/DC converter 30, and the charger 40 in the case 2 can be made shorter, it is possible to reduce resistance (R) and inductance (L) on the paths of direct-current electric power and to reduce electrical power loss and electric noise, and at the same time, it is possible to reduce the size of the power converter 1.

In addition, in the power converter 1 of the embodiment of the present invention, the first terminals and the second terminals are bus bars (the first bus bars 11 and the second bus bars 12), and the third terminals are flexible cables (the electrical power wires 13). With such a configuration, especially because the paths for connecting the third terminals can be arranged freely, the degree of freedom of arrangement of the respective components in the case 2 is increased, and it is possible to reduce the size of the power converter 1.

Second Embodiment

Next, a second embodiment of the present invention will be described with reference to the drawings.

A basic configuration of the second embodiment of the present invention is the same as that of the first embodiment shown in FIG. 1. Components that are the same as those in the first embodiment are assigned the same reference signs, and a description thereof shall be omitted.

Also in the second embodiment, as described with reference to FIGS. 1 to 3, the capacitor module 10 is connected to each of the power module 20, the DC/DC converter 30, and the charger 40 via the first bus bars 11, the second bus bars 12, and the electrical power wires 13, respectively. With such a configuration, because the distances between the capacitor module 10 and each of the power module 20, the DC/DC converter 30, and the charger 40 can be made shorter, it is possible to reduce resistance (R) and inductance (L) on the paths of direct-current electric power and to reduce electrical power loss and electric noise.

Furthermore, because the capacitor module 10 is arranged between the power module 20 and the charger 40 that generate large amount of heat, it is possible to suppress mutual influence by the heat between the power module 20 and the charger 40. Especially, because operation of the power module 20 (power running and regeneration of the motor generator 6) and operation of the charger 40 (charging of the battery 5 by the normal charging connector 81) are not performed at the same time, it is possible to eliminate influence by the heat between the operations.

Next, the configuration of the capacitor module 10 of the second embodiment of the present invention will be described.

Figure 4:
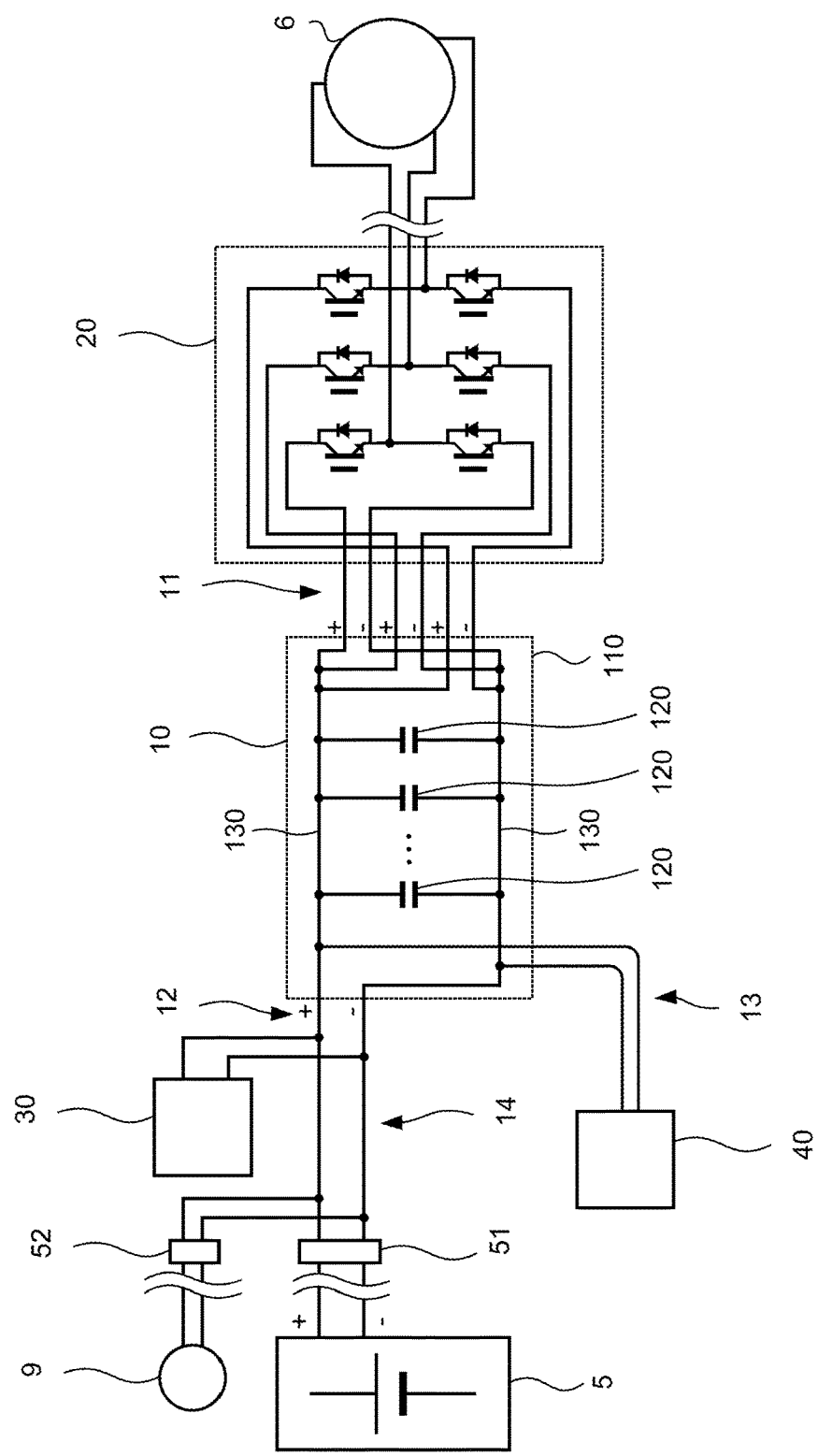
FIG. 4 is an electrical circuit diagram centered at a capacitor module 10 of a second embodiment of the present invention.

FIG. 4 is an electrical circuit diagram centered at the capacitor module 10 of the second embodiment of the present invention.

The capacitor module 10 is configured by accommodating a plurality of capacitors 120 in a capacitor case 110. The capacitor module 10 is provided with a pair of internal bus bars 130 composed of the positive electrodes and the negative electrodes, and the plurality of capacitors 120 are connected in parallel between the pair of internal bus bars 130. The capacitors 120 and the internal bus bars 130 are molded into resin material.

The internal bus bars 130 are respectively branched to the first bus bars 11, the second bus bars 12, and the electrical power wires 13.

The first bus bars 11 are formed of the bus bars forming three pairs of positive electrodes and negative electrodes corresponding to three phases of the power module 20, including the U-phase, the V-phase, and the W-phase, and the first bus bars 11 are provided so as to project out from a bottom surface of the capacitor case 110 towards the one side surface.

The second bus bars 12 are formed of the bus bars composed of a pair of positive electrodes and negative electrodes and are provided so as to project out from the bottom surface of the capacitor case 110 towards a second side surface adjacent to the above-mentioned one side surface. The electrical power wires 13 consist of flexible cables with a positive electrode and a negative electrode and are provided so as to extend towards the bottom surface side of the capacitor case 110.

In a state in which the first bus bars 11 are installed in the case 2, the first bus bars 11 have shapes so as to be in contact with terminals corresponding to three phases, including the U-phase, the V-phase, and the W-phase, provided in the power module 20 positioned at the one side surface side of the capacitor module 10. The first bus bars 11 are connected by using screws, etc. so as to be in contact with the terminals of the power module 20.

In a state in which the second bus bars 12 are installed in the case 2, the second bus bars 12 have shapes so as to be in contact with terminals provided in the DC/DC converter 30 positioned at the bottom surface side of the capacitor module 10. The second bus bars 12 are connected by using screws, etc. so as to be in contact with the terminals of the DC/DC converter 30. The bus bars 14 are connected to the terminals of the DC/DC converter 30. The bus bars 14 are respectively connected to the relays 61, the battery-side connector 51, and the compressor-side connector 52.

In a state in which the electrical power wires 13 are installed in the case 2, the electrical power wires 13 are connected to terminals provided in the charger 40 positioned on the side surface side of the capacitor module 10 that is opposite from the one side surface thereof. Because the electrical power wires 13 have flexibility, the electrical power wires 13 are connected to the terminals of the charger 40 such that there is no interference with the DC/DC charge controller 50 arranged above the charger 40, and with other components and structures provided in the case 2.

With such a configuration, the power module 20 is operated when the motor generator 6 is under power running and regeneration state (when the charger 40 is not operated), and the capacitor module 10 smoothes direct-current electric power from the power module 20 at this time. The charger 40 is operated when the battery 5 is being charged by the normal charging connector 81 during which the power module 20 is not operated, and the capacitor module 10 smoothes direct-current electric power from the charger 40 at this time. As described above, the capacitor module 10 functions as a smoothing capacitor that smoothes the direct-current electric power from the power module 20 and the charger 40.

As described above, in the second embodiment of the present invention, the power converter 1 converts and supplies electrical power between the power storage apparatus (the battery 5) and the load (the motor generator 6), and the power converter 1 is configured so as to include: the power module 20 that converts direct-current electric power from the battery 5 and alternating-current electric power to be supplied to the motor generator 6; the charger 40 that charges the battery 5 with electrical power supplied via the external connector (the normal charging connector 81); and a capacitor module that is connected to the power module 20 and the charger 40 and smoothes voltage when each of the power module 20 and the charger 40 is operated.

By being configured as described above, the capacitor module 10 is provided on an electrical power line between the power module 20 and the charger 40. In other words, the capacitor module 10 is shared with the power module 20 and the charger 40, and there is no need to further provide a separated capacitor, and thereby, it is possible to reduce the size of the power converter 1 and to reduce the weight of the power converter.

In addition, the power converter 1 of the second embodiment of the present invention includes the DC/DC converter 30 that converts direct-current voltage from the battery 5. The DC/DC converter 30 is connected to the capacitor module 10, and the capacitor module 10 smoothes voltage when each of the power module 20, the charger 40, and the DC/DC converter 30 is operated.

By being configured as described above, there is no need to further provide a separate smoothing capacitor for the DC/DC converter 30, and it is possible to reduce the size of the power converter 1 and to reduce the weight of the power converter.

In addition, in the power converter 1 of the second embodiment of the present invention, the capacitor module 10 includes the first terminals (the first bus bars 11), the second terminals (the second bus bars 12), and the third terminals (the electrical power wires 13), and the first terminals are connected to the power module 20, the second terminals are connected to the DC/DC converter 30, the third terminals are provided on the side of the capacitor module 10 opposite from the side where the first terminals are provided, and the third terminals are connected to the charger 40. With such a configuration, because electrical power paths between the capacitor module 10 and each of the power module 20, the DC/DC converter 30, and the charger 40 in the case 2 can be made shorter, it is possible to reduce resistance (R) and inductance (L) on the paths of direct-current electric power and to reduce electrical power loss and electric noise, and at the same time, it is possible to reduce the size of the power converter 1.

In addition, the power converter 1 of the second embodiment of the present invention is provided with the compressor-side connector 52 that is connected to an electric compressor 9 different from the load (the motor generator 6) and fourth terminals (the bus bars 14) that connect the capacitor module 10 and the compressor-side connector 52, and thereby, it is possible to smooth, by the capacitor module 10, noise of the fourth terminals connected to the electric compressor 9, which may generate noise.

Although the second embodiment of the present invention has been described above, the above-mentioned embodiment is only an illustration of one of application examples of the present invention, and there is no intention to limit the technical scope the present invention to the specific configuration of the above-mentioned embodiment.

In the second embodiment mentioned above, although the capacitor module 10 is connected to the charger 40 by using flexible cables (the electrical power wires 13), the configuration is not limited thereto. The capacitor module 10 may be connected to the charger 40 by bus bars, or the capacitor module 10 may be connected to the power module 20 or the DC/DC converter 30 by flexible cables.

Representative features of this embodiment other than those described above include followings.

(1) The vehicle power converter for converting electrical power between the power storage apparatus and the load including: the power module that converts direct-current electric power from the power storage apparatus and alternating-current electric power to be supplied to the load; the charger that converts alternating-current electric power, which is supplied via the external connector, to direct-current electric power and charges the power storage apparatus therewith; and the capacitor module that is connected to the power module and the charger and that smoothes voltage when each of the power module and the charger is operated.

(2) The vehicle power converter according to (1) including the DC/DC converter that converts direct-current voltage supplied from the power storage apparatus, and characterized in that the DC/DC converter is connected to the capacitor module, and that the capacitor module smoothes voltage when each of the power module, the charger, and the DC/DC converter is operated.

(3) The vehicle power converter according to (2) characterized in that the capacitor module includes the first terminals, the second terminals, and the third terminals, the first terminals are connected to the power module, the second terminals are connected to the DC/DC converter, the third terminals are provided on the side of the capacitor module opposite from the side where the first terminals are provided, and the third terminals are connected to the charger.

(4) The vehicle power converter according to (1) including the connector that is connected to the electric compressor different from the load and the fourth terminals that connect the capacitor module and the connector.

Third Embodiment

Next, a third embodiment of the present invention will be described with reference to the drawings.

A basic configuration of the third embodiment of the present invention is the same as that of the first embodiment shown in FIG. 1. Components that are the same as those in the first embodiment are assigned the same reference signs, and a description thereof shall be omitted.

Figure 5:
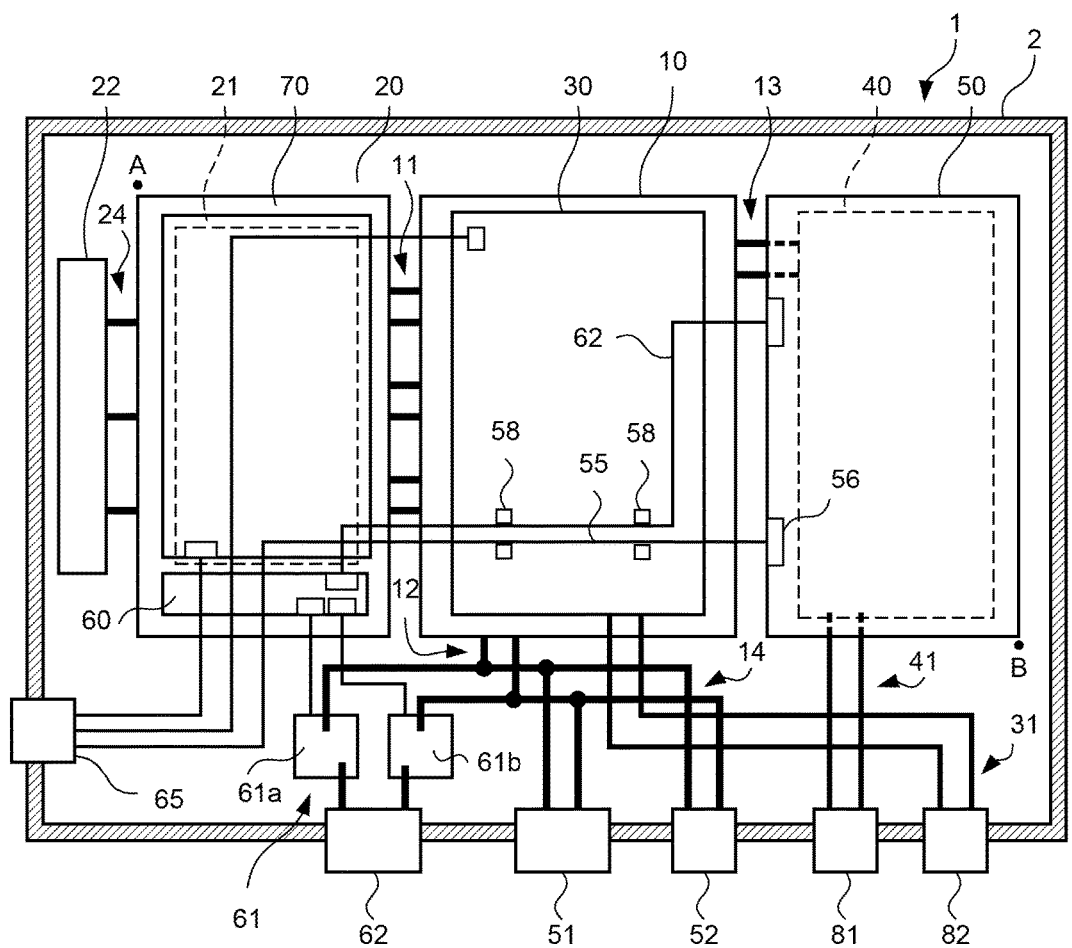
FIG. 5 is a functional block diagram of a power converter 1 of a third embodiment of the present invention.
Figure 6:
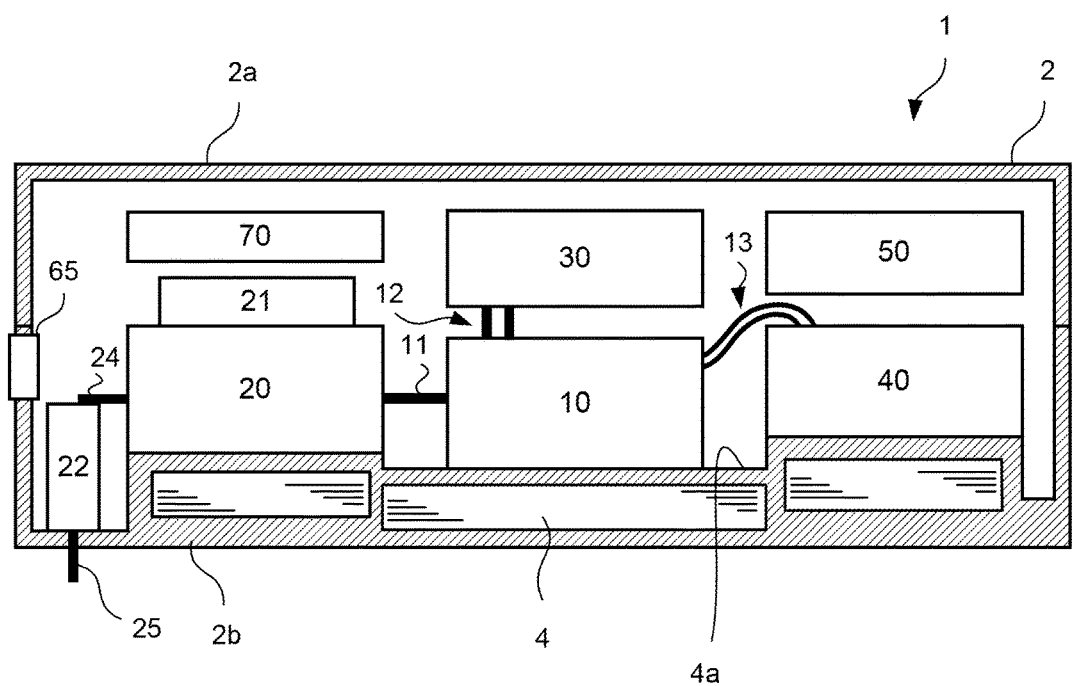
FIG. 6 is a structural block diagram of the power converter 1 of the third embodiment of the present invention.

FIGS. 5 and 6 are structural block diagrams of the power converter 1 of the third embodiment of the present invention. FIG. 5 is a top view of the power converter 1, and FIG. 6 is a side view of the power converter 1.

In the case 2, the power module 20, the DC/DC converter 30, and the charger 40 are arranged around the capacitor module 10.

More specifically, in the case 2, the capacitor module 10 is arranged between the power module 20 and the charger 40. The capacitor module 10 is layered over the DC/DC converter 30, and the DC/DC converter 30 is arranged below the capacitor module 10. The charger 40 is layered over the DC/DC charge controller 50, and the charger 40 is arranged below the DC/DC charge controller 50.

The first bus bars 11 project out from one side surface of the capacitor module 10. The first bus bars 11 are directly connected to the power module 20 by using screws, etc.

From the power module 20, three-phase output bus bars 24 that consist of the U-phase, the V-phase, and the W-phase project out at the opposite side from the first bus bars 11.

The output bus bars 24 are directly connected to the current sensor 22 by using screws, etc. The motor-side bus bars 25 project out from the bottom side of the current sensor 22 (see FIG. 6). The motor-side bus bars 25 are respectively connected to the U-phase, the V-phase, and the W-phase of the output bus bars 24 of the power module 20 directly, and output three-phase alternating-current electric power. The motor-side bus bars 25 are formed so as to be exposed from the case 2 and are connected to the motor generator 6 by a harness, etc.

The drive substrate 21 is layered on the top surface of the power module 20. The inverter controller 70 and the relay controller 60 are arranged so as to be layered above the drive substrate 21.

The second bus bars 12 project out from the bottom surface side of the capacitor module 10. The second bus bars 12 are connected, by using screws, directly to the DC/DC converter 30 that is arranged so as to be layered above the capacitor module 10. The second bus bars 12 are connected to the positive-side relay 61a and the negative-side relay 61b (see FIG. 5).

The second bus bars 12 are respectively connected via bus bars 14 to the battery-side connector 51 to which the battery 5 is connected and the compressor-side connector 52 to which the electric compressor is connected.

The DC/DC converter 30 is connected to the vehicle-side connector 82 via the bus bars 31. The vehicle-side connector 82 is connected to harnesses, etc. for supplying direct-current power supply output from the DC/DC converter 30 to respective parts of the vehicle.

The electrical power wires 13 project out from the side of the capacitor module 10 opposite from the first bus bars 11. The electrical power wires 13 are flexible cables having bendability and are connected to the charger 40. The charger 40 is connected to the normal charging connector 81 via bus bars 41.

The signal line connector 65 allows connection between the outside of the case 2 and the signal lines connected to the DC/DC converter 30, the charger 40, the DC/DC charge controller 50, and the inverter controller 70 of the power converter 1.

The signal line 55 is connected between the signal line connector 65 and the DC/DC charge controller 50. The signal line 55 is connected to the connector 56 of the DC/DC charge controller 50 by extending through a top surface of the DC/DC converter 30 together with the signal line 62 provided from the DC/DC charge controller 50 to the relay controller 60. The guide parts 58 for supporting the signal line 55 and the signal line 62 are formed on the top surface of the DC/DC converter 30.

The case 2 is formed of the upper case 2a and the bottom case 2b. The coolant-water channel 4 is formed in the bottom case 2b. The coolant-water channel 4 is formed such that the coolant water flows therethrough and cools the power module 20, the capacitor module 10, and the charger 40 mounted directly above the coolant-water channel 4.

As described above, the power converter 1 of the third embodiment of the present invention is the power converter 1 that converts and supplies electrical power between the power storage apparatus (the battery 5) and the load (the motor generator 6) and that includes: the power module 20 that converts direct-current electric power from the battery 5 and alternating-current electric power to be supplied to the motor generator 6; the DC/DC converter 30 that converts direct-current voltage from the battery 5; the charger 40 that charges the battery 5 with electrical power supplied via the external connector (the normal charging connector 81); the capacitor module that has capacitor for smoothing voltage; and the case 2 that accommodates the power module 20, the DC/DC converter 30, the charger 40, and the capacitor module 10. In the power converter 1, the power module 20, the DC/DC converter 30, and the charger 40 are arranged around the capacitor module 10 in the case 2.

With the above-mentioned configuration, because the distances between the capacitor module 10 and each of the power module 20, the DC/DC converter 30, and the charger 40 can be made shorter in the case 2, it is possible to reduce resistance (R) and inductance (L) on the paths of direct-current electric power and to reduce electrical power loss and electric noise. Furthermore, because the distances between the capacitor module 10 and each of the power module 20, the DC/DC converter 30, and the charger 40 can be made shorter in the case 2, it is possible to reduce the size of the power converter 1.

In addition, in the power converter 1 of the third embodiment of the present invention, the capacitor module 10 is arranged between the power module 20 and the charger 40. In other words, because the capacitor module 10 is arranged between the power module 20 and the charger 40 that generate large amount of heat, it is possible to suppress mutual influence by the heat between the power module 20 and the charger 40. Especially, because operation of the power module 20 (power running and regeneration of the motor generator 6) and operation of the charger 40 (charging of the battery 5 by electrical power from the normal charging connector 81) are not performed at the same time, it is possible to eliminate influence by the heat between the operations.

In addition, in the power converter 1 of the third embodiment of the present invention, because the DC/DC converter 30 is arranged so as to be layered with the capacitor module 10, the capacitor module 10, and the DC/DC converter 30 are arranged so as to be adjacent in the layered direction in the case 2, and it is possible to reduce the size of the power converter 1.

In addition, in the power converter 1 of the third embodiment of the present invention, the capacitor module 10 includes the first bus bars 11, the second bus bars 12, and the electrical power wires 13, and the first terminals are connected to the power module 20, the second terminals are connected to the DC/DC converter 30, and the third terminals are connected to the charger 40. With such a configuration, because electrical power paths between the capacitor module 10 and each of the power module 20, the DC/DC converter 30, and the charger 40 in the case 2 can be made shorter, it is possible to reduce resistance (R) and inductance (L) on the paths of direct-current electric power and to reduce electrical power loss and electric noise, and at the same time, it is possible to reduce the size of the power converter 1.

In addition, in the power converter 1 of the third embodiment of the present invention, the first terminals and the second terminals are the first bus bars 11 and the second bus bars 12, respectively, and the third terminals are the flexible cables (the electrical power wires 13). With such a configuration, especially because the paths for connecting the third terminals can be arranged freely, the degree of freedom of arrangement of the respective components in the case 2 is increased, and it is possible to reduce the size of the power converter 1.

Fourth Embodiment

Next, a fourth embodiment of the present invention will be described.

A basic configuration of the fourth embodiment of the present invention is the same as that of the first embodiment shown in FIG. 1. Components that are the same as those in the first embodiment are assigned the same reference signs, and a description thereof shall be omitted.

Figure 7:
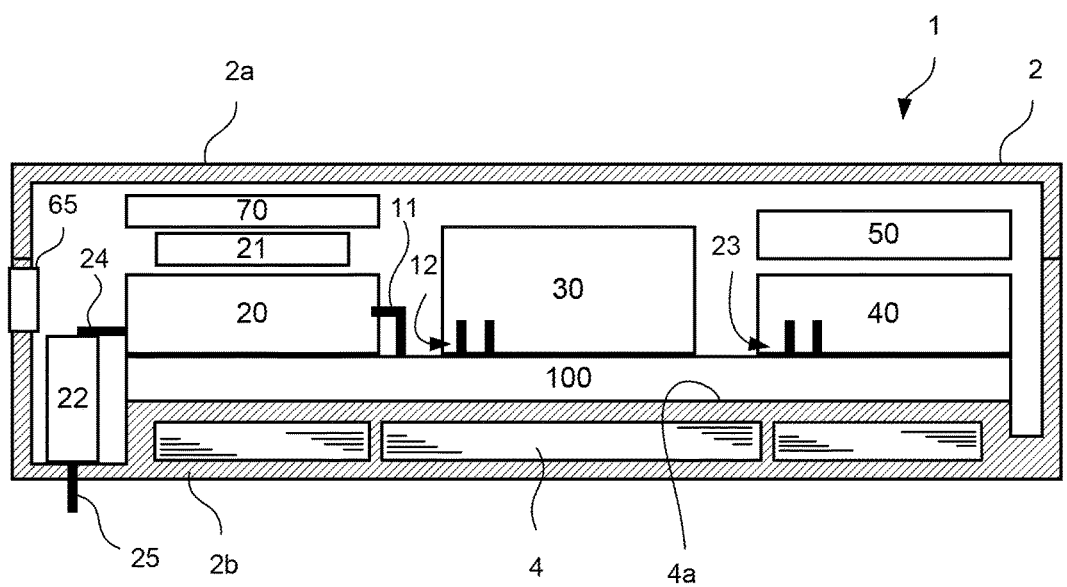
FIG. 7 is a structural block diagram of the power converter 1 of a fourth embodiment of the present invention.

FIG. 7 is a side view of the power converter 1 of the fourth embodiment of the present invention.

In the configuration of the above-mentioned third embodiment, the capacitor module 10 is arranged between the power module 20 and the charger 40, and the DC/DC converter 30 is arranged so as to be layered above the capacitor module 10.

In contrast, in the configuration of the fourth embodiment of the present invention, a capacitor module 100 is mounted on a cooling surface of the case 2, and the power module 20, the DC/DC converter 30, and the charger 40 are mounted above the capacitor module 100.

As shown in FIG. 7, the coolant-water channel 4 is formed in the bottom case 2b. In the bottom case 2b, thin plate-like capacitor module 100 is mounted above the coolant-water channel 4 so as to cover substantially the whole surface area of the top side of an inner surface (hereinafter, referred to as "a cooling surface 4a") of the bottom case 2b. In other words the capacitor module 100 is formed so as to have substantially the same area as that of the cooling surface 4a when viewed in a planar view.

The power module 20, the DC/DC converter 30, and the charger 40 are mounted above the capacitor module 100. The DC/DC converter 30 is arranged between the power module 20 and the charger 40.

The capacitor elements forming the capacitor module 100 are formed by laminating, for example, metallic thin films and dielectric thin films. The capacitance of the capacitor module 100 corresponds to the area of the laminated thin films. Thus, it is possible to increase the degree of freedom of the shape by changing the shapes of the thin films and the shapes of the laminate. In this embodiment, by forming the rectangle capacitor module 100 such that its external shape becomes thin in the top-down direction as much as possible, the capacitor module 100 is formed to have a thin plate-like shape while ensuring the required capacitance.

As an example, when the capacitor module 100 has a rectangular shape having a diagonal line between a point A and a point B in a planar view shown in FIG. 5, it is possible to form the capacitor module 100 so as to have, in the top-down direction, a thickness of about one third of that of the capacitor module 10 shown in FIGS. 5 and 6 even when the capacitance is the same.

The capacitor module 100 of the fourth embodiment of the present invention is arranged over substantially the entire surface below the power module 20, the DC/DC converter 30, and the charger 40, and the bus bars are provided so as to project out towards the upper side of the capacitor module 100. More specifically, the bus bars composed of the positive electrodes and the negative electrodes are arranged over the entire inner surface of the thin plate-like capacitor module 100, and the bus bars composed of the positive electrodes and the negative electrodes are erected upwards at arbitrary positions. With such a configuration, it is possible to arrange the bus bars at arbitrary positions above the thin plate-like capacitor module.

With such a configuration, it is possible to respectively arrange the first bus bars 11, the second bus bars 12, and third bus bars 23 of the capacitor module 100 at the closest locations to the power module 20, the DC/DC converter 30, and the charger 40 to achieve connections therewith. Therefore, because the electrical power paths between the capacitor module 100 and each of the power module 20, the DC/DC converter 30, and the charger 40 can be made shorter, it is possible to reduce resistance (R) and inductance (L) on the paths of direct-current electric power and to reduce electrical power loss and electric noise, and at the same time, it is possible to reduce the size (thickness) of the power converter 1 in the top-down direction in relation to that of the first embodiment.

In addition, because the bus bars can be arranged at arbitrary positions of the capacitor module 100, it is possible to freely decide locations of the respective components that are arranged above the capacitor module 100. Thus, because the degree of freedom of layout is increased and the degree of freedom arrangement of the respective components in the case 2 of the power converter 1 is increased, it is possible to reduce the size of the power converter 1.

Figure 8:
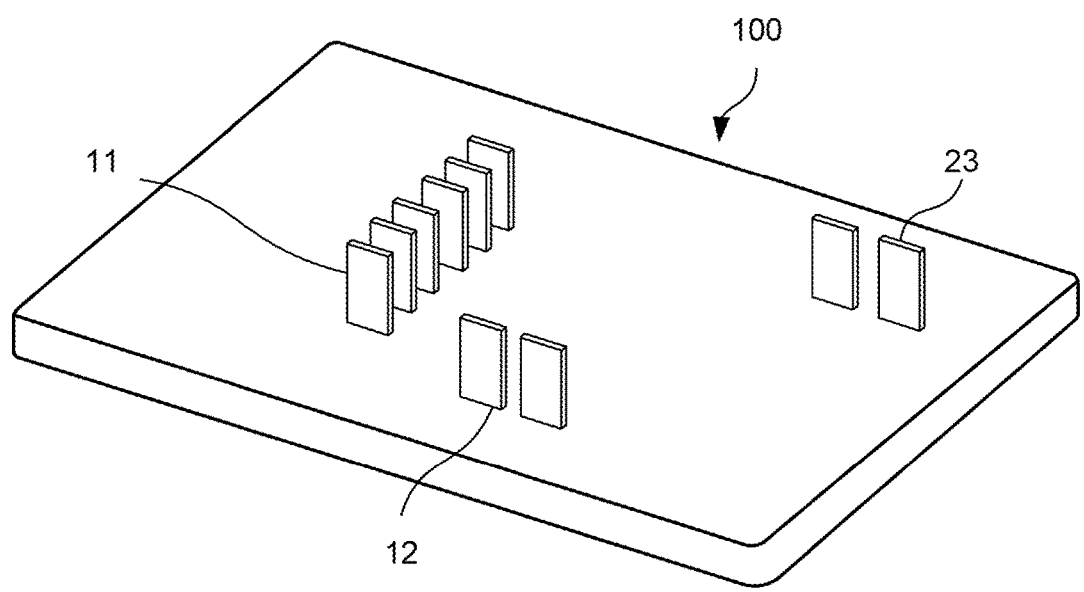
FIG. 8 is a perspective view for explaining the capacitor module 10 of the fourth embodiment of the present invention.

FIG. 8 is a perspective view for explaining the capacitor module 100 of the fourth embodiment of the present invention.

The capacitor module 100 includes the first bus bars 11, the second bus bars 12, and the third bus bars 23. The first bus bars 11, the second bus bars 12, and the third bus bars 23 are provided so as to project out to the upper side of the capacitor module 100 and are respectively provided so as to correspond to the positions at which the power module 20, the DC/DC converter 30, and the charger 40 are mounted.

The first bus bars 11 are formed of six bus bars respectively forming pairs of the positive electrodes and the negative electrodes for the U-phase, the V-phase, and the W-phase so as to correspond to input terminals of the power module 20.

The second bus bars 12 are formed of two bus bars composed of a pair of the positive electrode and the negative electrode so as to correspond to input terminals of the DC/DC converter 30.

The third bus bars 23 are formed of two bus bars composed of a pair of the positive electrode and the negative electrode so as to correspond to input terminals of the charger 40.

When mounted on the top surface of the capacitor module 100, the power module 20, the DC/DC converter 30, and the charger 40 are electrically connected to the first bus bars 11, the second bus bars 12, and the third bus bars 23, respectively.

As described above, in the fourth embodiment of the present invention, in the case 2, the thin plate-like capacitor module 100 is arranged on the cooling surface 4a of the bottom case 2b, and the power module 20, the DC/DC converter 30, and the charger 40 are mounted above the capacitor module 100.

As described above, by forming the capacitor module 100 to have a thin plate-like shape and by arranging the capacitor module 100 over substantially the entire surface of the cooling surface 4a of the bottom case 2b, the volume of the capacitor module 100 in the top-down direction occupying the space in the case 2 is reduced, it is possible to make the power converter 1 thinner.

Figure 9:
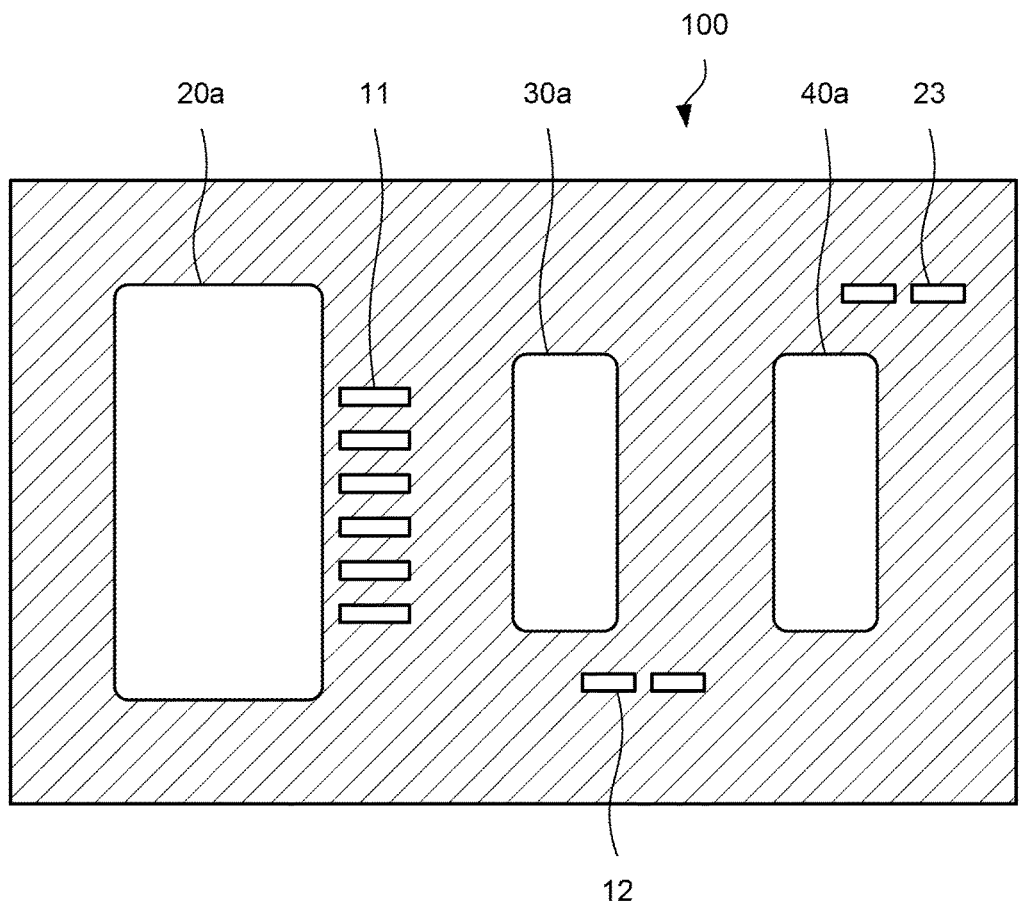
FIG. 9 is an explanatory diagram showing another example configuration of the capacitor module 10 of the fourth embodiment of the present invention.
Figure 10:
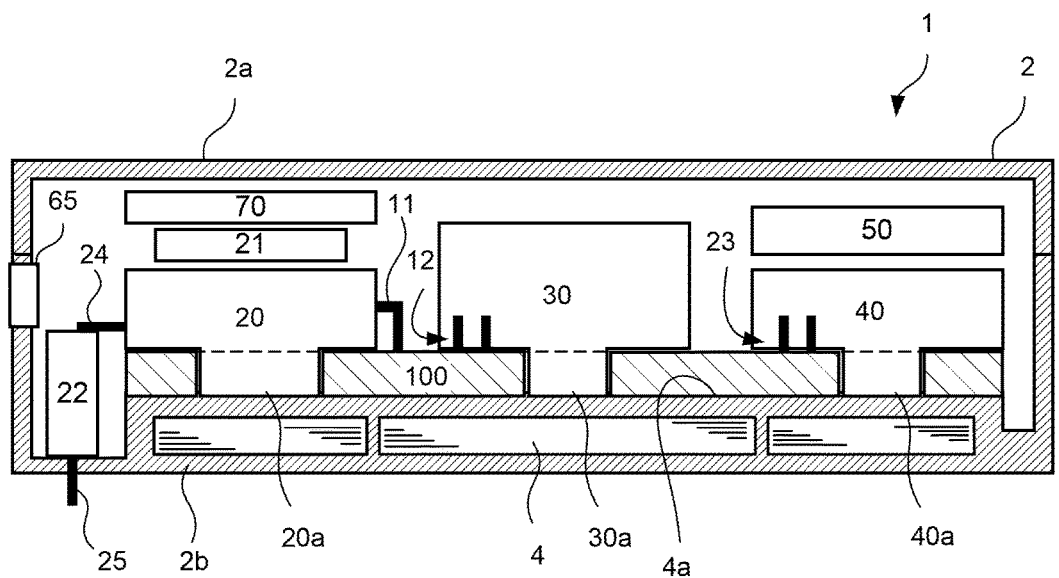
FIG. 10 is a sectional view of the power converter provided with the capacitor module having another example configuration of the fourth embodiment of the present invention.

FIG. 9 is an explanatory diagram showing another example configuration of the capacitor module 100 of the fourth embodiment of the present invention, and FIG. 10 is a sectional view of the power converter to which the capacitor module of the fourth embodiment of the present invention having the another example configuration is applied.

As shown in FIG. 7, when the capacitor module 100 is arranged over substantially the entire surface of the cooling surface 4a of the bottom case 2b, heat resistance between the cooling surface 4a and each of the power module 20, the DC/DC converter 30, and the charger 40 is increased.

Thus, in order to increase cooling efficiency of the power module 20, the DC/DC converter 30, and the charger 40, the capacitor module 100 is provided with opening portions such that the cooling surface 4a is brought into direct contact with the power module 20, the DC/DC converter 30, and the charger 40.

As shown in FIG. 9, an opening portion 20a is formed at a position at which the power module 20 is brought into direct contact with the cooling surface 4a. Similarly, an opening portion 30a is formed at a position at which the DC/DC converter 30 is brought into direct contact with the cooling surface 4a, and an opening portion 40a is formed at a position at which the charger 40 is brought into direct contact with the cooling surface 4a.

As shown in FIG. 10, the power module 20, the DC/DC converter 30, and the charger 40 are respectively provided with heat-conducting portions, which are formed of metal, for example, at positions corresponding to the opening portions 20a, 30a, and 40a. Heat-generating components such as semiconductor devices, inductors, and so forth provided in the power module 20, the DC/DC converter 30, and the charger 40 perform direct heat exchange with the cooling surface 4a via the heat-conducting portions.

As described above, it is possible to change the external shape of the capacitor module 100 in various ways while ensuring capacitance required. Therefore, as shown in FIG. 6, by forming the opening portions such that the power module 20, the DC/DC converter 30, and the charger 40 that are mounted above the capacitor module 100 are brought into direct contact with the cooling surface 4a, it is possible to increase the heat-releasing efficiency and to improve the efficiency of the power converter 1.

Figure 11:
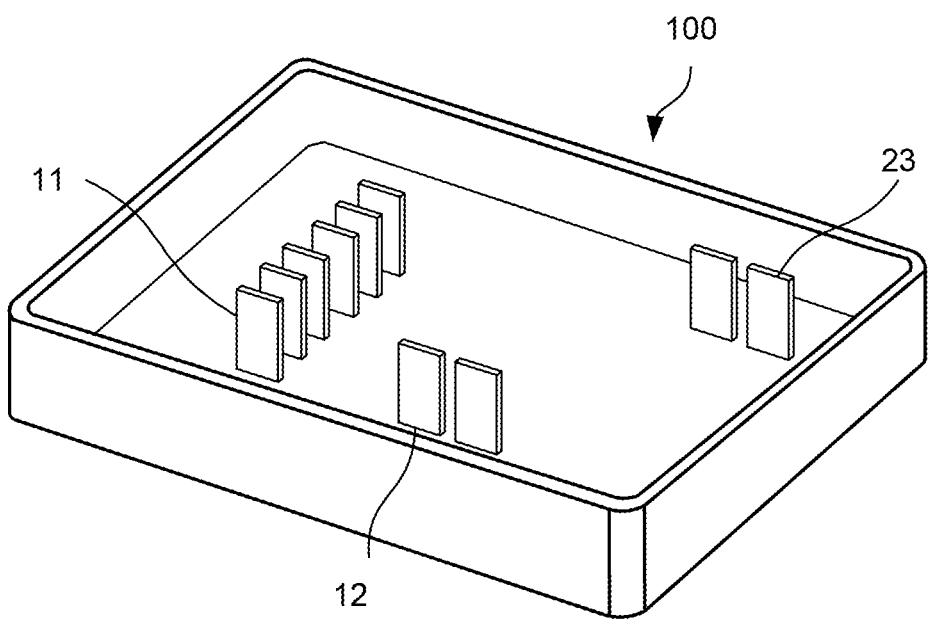
FIG. 11 is an explanatory diagram showing another example configuration of the capacitor module 10 of the fourth embodiment of the present invention.

FIG. 11 is an explanatory diagram showing another example configuration of the capacitor module 100 of the fourth embodiment of the present invention.

The capacitance of the capacitor module 100 depends on the volume of the laminate of the metallic thin films and the dielectric thin films. Thus, in order to further make the power converter 1 thinner while ensuring capacitance required for the capacitor module 100, as shown in FIG. 11, the capacitor module 100 may be formed to have a box-like shape.

More specifically, by making the thickness of the side of the capacitor module 100 that is in contact with the cooling surface 4a thinner than that of the shape shown in FIG. 8, and by forming the box-like shape with its four sides erected upwards and by utilizing the space corresponding to the erected portions as the capacitor element, it is possible to make the thickness of the surface of the capacitor module 100 in contact with the cooling surface 4a thinner, and therefore, it is possible to make the power converter 1 thinner further more.

Although the fourth embodiment of the present invention has been described above, the above-mentioned embodiment is only an illustration of one of application examples of the present invention, and there is no intention to limit the technical scope of the present invention to the specific configuration of the above-mentioned embodiment.

Although the capacitor module 10 and the charger 40 are connected by the flexible cables (the electrical power wires 13) in the above-mentioned third embodiment, the capacitor module 100 is connected to the charger 40 by the bus bars (the third bus bars 23) in the fourth embodiment, the configurations are not limited thereto. The capacitor module 100 may be connected to the power module 20 or the DC/DC converter 30 by the flexible cables.

Representative features of the third and the fourth embodiments of the present invention other than those described above include followings.

(1) The power converter for converting and supplying electrical power between the power storage apparatus and the load including: the power module that converts direct-current electric power from the power storage apparatus and alternating-current electric power to be supplied to the load; the DC/DC converter that converts direct-current voltage from the power storage apparatus; the charger that converts alternating-current electric power, which is supplied via the external connector, to direct-current electric power and charges the power storage apparatus therewith; the capacitor module that has the capacitor that is connected to the power module, the DC/DC converter, and the charger and that smoothes voltage; and the case that accommodates the power module, the DC/DC converter, the charger, and the capacitor module and that has the cooling surface, and characterized in that, in the case, the power module, the charger, and the DC/DC converter are arranged around the capacitor module, the DC/DC converter is arranged between the power module and the charger, and the capacitor module is mounted on the cooling surface.

(2) The power converter according to (1) characterized in that the capacitor module is formed to have a thin plate-like shape and mounted on the cooling surface, and the power module, the DC/DC converter, and the charger are mounted above the capacitor module.

(3) The power converter according to (1) characterized in that the capacitor module is formed so as to have substantially the same area as that of the cooling surface when viewed in a planar view.

(4) The power converter according to any one of (1) to (3) characterized in that, the capacitor module is provided with the bus bar, which is electrically connected to at least one of the power module, the DC/DC converter, and the charger, such that the bus bar projects upwards.

(5) The power converter according to any one of (2) to (4) characterized in that, the capacitor module has the opening portions at positions corresponding to at least one of the power module, the DC/DC converter, and the charger such that the cooling surface is brought into direct contact with the power module, the DC/DC converter, and the charger.

This application claims priority based on Japanese Patent Application No. 2015-101113 filed with the Japan Patent Office on May 18, 2015, Japanese Patent Application No. 2015-101134 filed with the Japan Patent Office on May 18, 2015, and Japanese Patent Application No. 2016-089221 filed with the Japan Patent Office on Apr. 27, 2016, the entire contents of which are incorporated into this specification.

The invention claimed is:

1. A power converter for converting and supplying electrical power between a power storage apparatus and a load, comprising:
a power module configured to convert direct-current electric power from the power storage apparatus to alternating-current electric power to be supplied to the load;
a DC/DC converter configured to convert direct-current voltage from the power storage apparatus;
a charger configured to convert external alternating-current electric power to direct-current electric power and charge the power storage apparatus therewith, the external alternating-current electric power being supplied via an external connector;
a capacitor module that has a capacitor and connected to the power module, the charger, and the DC/DC converter; and
a case configured to accommodate the power module, the DC/DC converter, the charger, and the capacitor module, wherein
in the case, the power module, the charger, and the DC/DC converter are arranged around the capacitor module, and the capacitor module and the DC/DC converter are arranged between the power module and the charger.

2. The power converter according to claim 1, wherein the DC/DC converter is arranged so as to be layered with the capacitor module.

3. The power converter according to claim 1, wherein the capacitor module comprises a first terminal, a second terminal, and a third terminal,
the first terminal is connected to the power module,
the second terminal is connected to the DC/DC converter, and
the third terminal is connected to the charger.

4. The power converter according to claim 3, wherein the first terminal and the second terminal are bus bars, and the third terminal is a flexible cable.

5. The power converter according to claim 1, wherein the capacitor module is connected to the power module and the charger, which are configured so as not to be operated at a same time, the capacitor module being configured to smooth voltage when each of the power module and the charger is operated.

6. The power converter according to claim 5, wherein the capacitor module comprises a first terminal, a second terminal, and a third terminal,
the first terminal is connected to the power module,
the second terminal is connected to the DC/DC converter, and
the third terminal is provided on a side of the capacitor module opposite from a side where the first terminal is provided, the third terminal being connected to the charger.

7. The power converter according to claim 6, further comprising
a connector connected to an electric compressor different from the load and a fourth terminal configured to connect the capacitor module and the connector.

8. A power converter for converting and supplying electrical power between a power storage apparatus and a load comprising:
a power module configured to convert direct-current electric power from the power storage apparatus to alternating-current electric power to be supplied to the load;
a DC/DC converter configured to convert direct-current voltage from the power storage apparatus;
a charger configured to convert external alternating-current electric power to direct-current electric power and charge the power storage apparatus therewith, the external alternating-current electric power being supplied via an external connector;

a capacitor module that has a capacitor and connected to the power module, the charger, and the DC/DC converter; and a case configured to accommodate the power module, the DC/DC converter, the charger, and the capacitor module, the case being configured to have a cooling surface, wherein in the case, the power module, the charger, and the DC/DC converter are arranged around the capacitor module, and the DC/DC converter is arranged between the power module and the charger, and the capacitor module is mounted on the cooling surface.

9. The power converter according to claim 8, wherein the capacitor module is formed to have a thin plate-like shape, and the power module, the DC/DC converter, and the charger are mounted above the capacitor module.

10. The power converter according to claim 9, wherein the capacitor module is formed so as to have substantially the same area as that of the cooling surface when viewed in a planar view.

11. The power converter according to claim 9, wherein the capacitor module has an opening portion at a position corresponding to at least one of the power module, the DC/DC converter, or the charger, the opening portion being configured such that the at least one of the power module, the DC/DC converter, or the charger is brought into direct contact with the cooling surface therethrough.

12. The power converter according to claim 8, wherein the capacitor module is provided with a bus bar electrically connected to at least one of the power module, the DC/DC converter, or the charger, the bus bar being provided so as to project upwards.

* * * * *